March 3, 1970 A. F. NYLANDER 3,498,745
METHOD OF DECOMPOSING CARNALLITE AND
MIXTURES CONTAINING CARNALLITE
Filed April 19, 1965 3 Sheets-Sheet 1
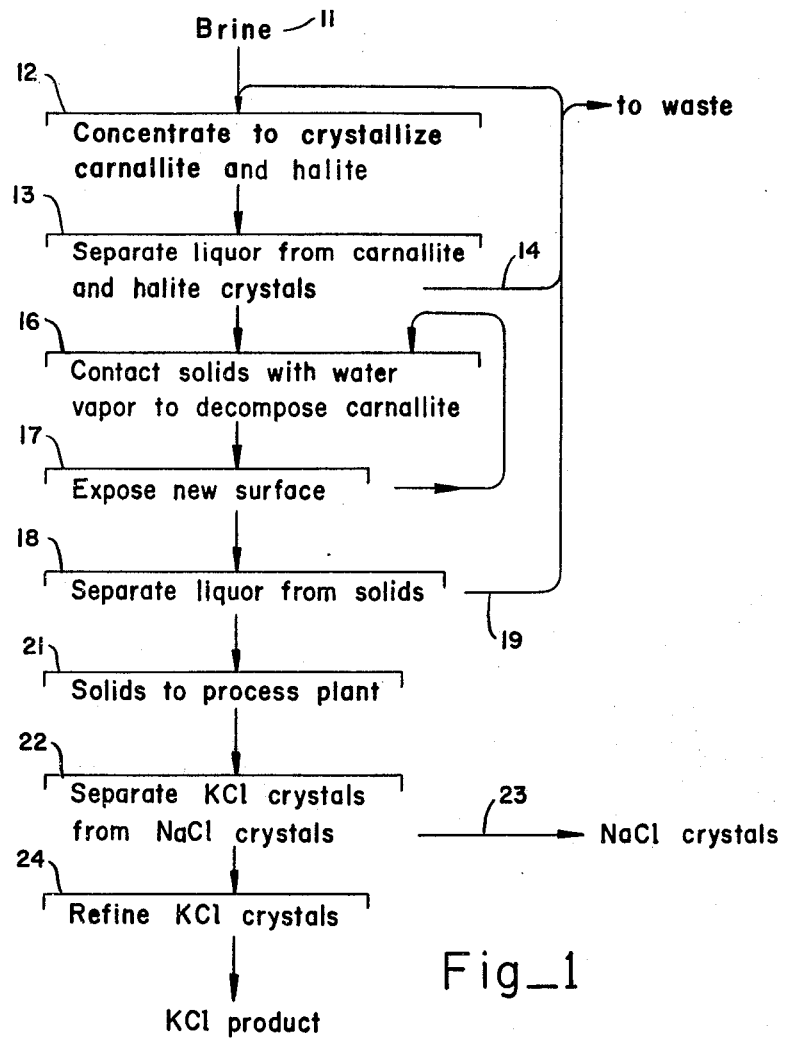
Fig_1
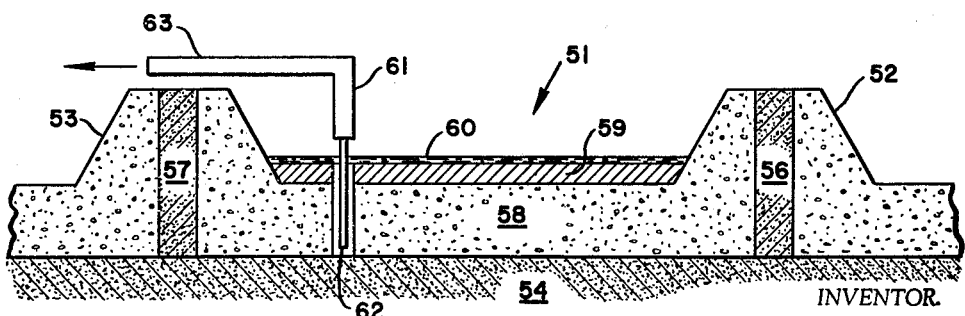
Fig_5
INVENTOR.
ALBERT F. NYLANDER
BY
ATTORNEYS

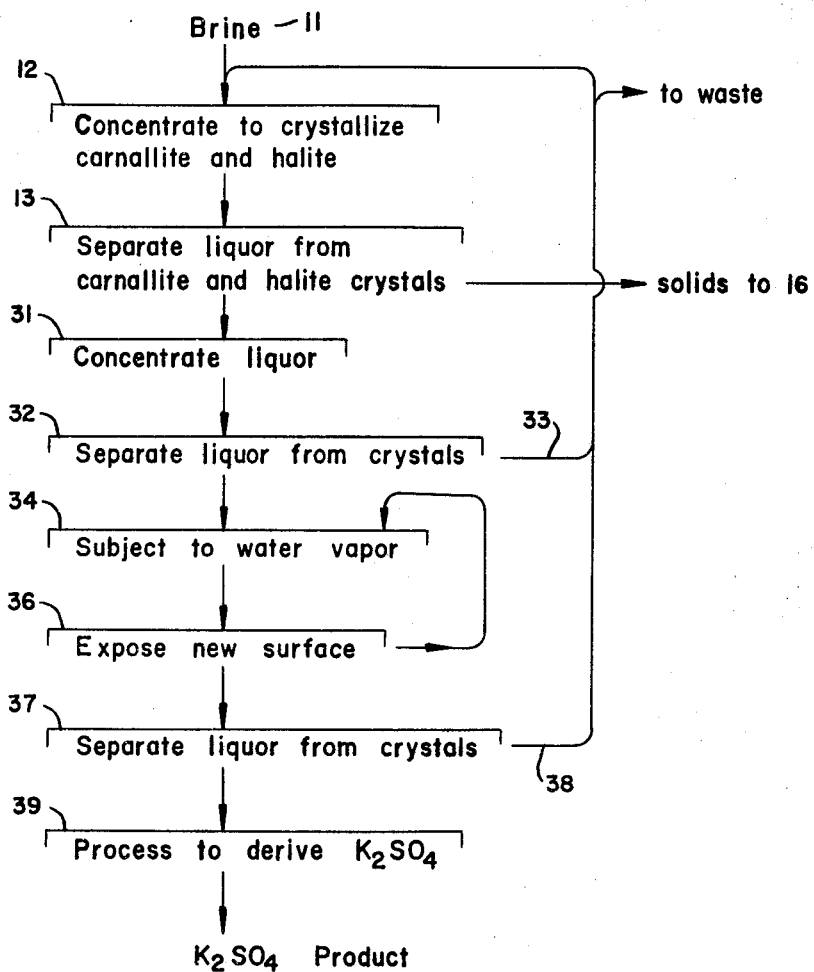
Fig_2

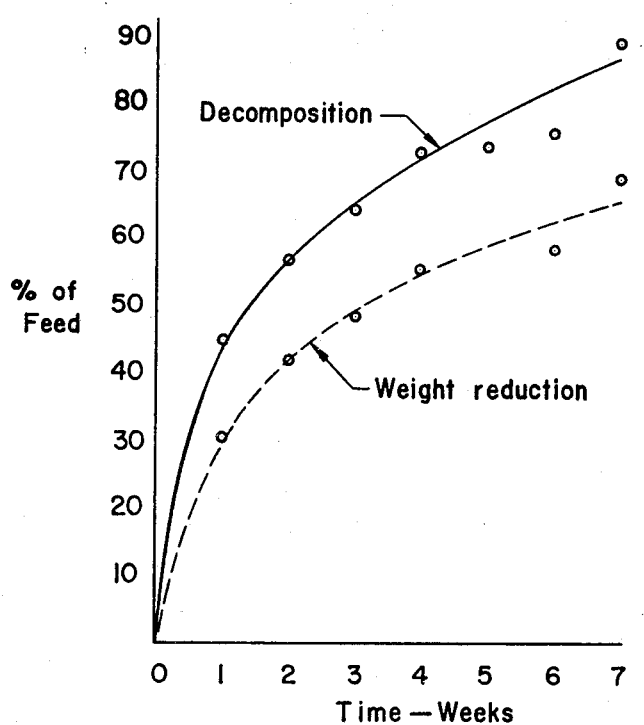
Fig_3
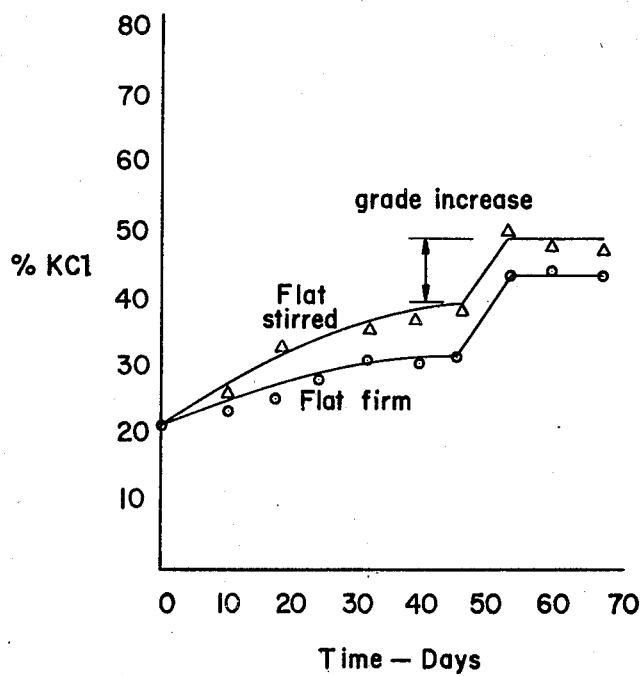
Fig_4

# United States Patent Office 3,498,745
Patented Mar. 3, 1970

3,498,745
METHOD OF DECOMPOSING CARNALLITE AND MIXTURES CONTAINING CARNALLITE
Alfred F. Nylander, Redwood City, Calif., assignor to Minera Bayovar, S.A., Palo Alto, Calif., a corporation of Delaware
Filed Apr. 19, 1965, Ser. No. 449,025
Int. Cl. C01c *3/00, 3/14*
U.S. Cl. 23—89
10 Claims

ABSTRACT OF THE DISCLOSURE

A method of decomposing carnallite gradually by contact with water vapor to produce crystals of potassium chloride of a particle size greater than 65 mesh. Carnallite crystallized from marine brines by solar evaporation is decomposed in situ to large crystals of KCl, reducing the weight of solids to be harvested.

---

This invention relates to a method of decomposing carnallite ($KCl \cdot MgCl_2 \cdot 6H_2O$) into potassium chloride and the resultant potassium chloride crystals. More particularly the invention relates to decomposition of carnallite using water vapor.

The invention of the present application has particular utility in conjunction with the method and apparatus described in my copending application Ser. No. 435,489, filed Feb. 26, 1965. In the copending application, there is disclosed a method and apparatus for separating the components of brine by concentrating the brine while separating the various crystalline solids from the remaining liquor. The method and apparatus are particularly adapted for producing solid carnallite crystals. The solid carnallite crystals are then subjected to the treatment defined herein to produce a novel product.

Evaporation of brines containing potassium and magnesium chloride, by either mechanical or solar means, leads to formation of the salt carnallite $$(KCl \cdot MgCl_2 \cdot 6H_2O)$$

In solar pan operations, for example, the carnallite in the past has been harvested by wet means with special dredges. The carnallite solids, normally mixed with halite (NaCl) and possibly other salts, are pumped to the process plant where they are decomposed to form solid KCl and a liquor containing the $MgCl_2$ as well as the crystalline water from the initial solid phases. The KCl formed in this way has been separated from the NaCl by flotation or by leaching and crystallization. In flotation procedures, the efficiency has been frequently very low due to the fact that the particle size is fine and the product after leaching to a satisfactory grade does not have an acceptable particle size for any significant part of the world market. To overcome the objection of small particle size, it has often been necessary to either compact the flotation concentrate or to leach and recrystallize in vacuum crystallizers. Either of these methods is expensive and increases the cost of the overall process.

Past efforts have required substantial expenditures in (1) harvesting and transporting the carnallite crystals frequently in a brine slurry; (2) in separating the KCl from the halite after the decomposition of carnallite; and (3) in extensive treatment to recrystallize or otherwise improve the particle size of the KCl.

Moreover, open storage of carnallite has generally been avoided in the past, primarily because of the deliquescence of carnallite crystals. This deliquescence causes absorption of water which cements the surface of a pile of carnallite crystals so that it is difficult to handle and transport. For example, Thorpe's Dictionary of Applied Chemistry (4th edition) states: "Owing to the extreme deliquescence of the salt, crystals must be preserved in sealed vessels." (Page 390, volume 4.) As a result, dry methods of storage of carnallite have not generally been practiced.

Muriate of potash (KCl) has wide utility in the fertilizer industry. It has been estimated that 90% of all potash products are used in fertilizer. Potassium sulfate and other potassium compounds are readily derived from KCl by conventional techniques.

It is accordingly an object of this invention to provide a novel method of decomposing carnallite which will overcome the defects and disadvantages pointed out above in connection with the prior art.

A further object of this invention is to produce an improved potassium chloride obtained from carnallite.

A further object of this invention is to reduce the harvesting and transportation costs in deriving KCl from carnallite.

A further object of the invention is to provide an improved particle size KCl of marketable quality which does not require compaction or recrystallization.

A further object is to provide an improved method of separating KCl from NaCl.

A further object of the invention is to provide an improved method of recovering essentially fresh water at low cost.

A further object of the invention is to provide a novel product resulting from the foregoing process.

Additional objects of the invention will appear from the following description in which the preferred embodiments of the invention have been set forth in detail in conjunction with the accompanying drawings.

Referring to the drawings:

FIGURE 1 is a flow sheet of the process of the present invention for recovery of KCl.

FIGURE 2 is a flow sheet of the process of the present invention for recovery of $K_2SO_4$.

FIGURE 3 is a graph illustrating the relationship between time and the percent of decomposition and of weight reduction.

FIGURE 4 is a graph illustrating the improvement in the percent KCl during the decomposition process.

FIGURE 5 is an elevation in cross-section illustrating the construction of a pan useful in carrying out the process.

In FIGURE 1, the process is illustrated by a flow sheet. Incoming brine 11 is concentrated so as to crystallize carnallite in step 12. The carnallite is mixed with various contaminants, depending on the initial composition and the concentration. Concentration is carried out by any suitable means. Included are solar evaporation in diked ponds, evaporation by triple effect evaporators, by submerged combustion or by any other means suitable to increase the concentration to a density at which carnallite crystallizes. For example, a density between about 1.30 and 1.36 is necessary to crystallize carnallite from sea water at 32° C.

The incoming brine is any brine having the characteristic components K, Cl, and Mg. In addition, Ca, Na and $SO_4$, as well as other ions, may be present. Brine 11 may be sea water in an unconcentrated state or an inland brine. On the other hand, the incoming brine 11 may be the waste products from a manufacturing operation which contains potassium.

I have found the process described in my copending application, Ser. No. 435,489, filed Feb. 26, 1965, to be highly successful in producing the carnallite crystals in step 12. The amount of halite mixed with carnallite is preferably small, and the process outlined in my copending application results in such a mixture.

After the brine has been concentrated to crystallize out a mixture of carnallite and halite, the liquor is separated from the crystals in step 13. The liquor 14 is returned to the incoming brine feed 11. If, however, the liquor 14 is highly contaminated, it is discharged to waste.

The separation in step 13 takes place in any convenient manner. On a small scale, I have found it satisfactory to simply shovel the crystals onto raised flats or platforms which drain the liquor away from the crystals by gravity. On a large scale continuous operation, I pump the liquor away from the crystals which are left remaining where they are formed. To this end it is desirable but not mandatory that the liquor may percolate down through the pan bottom to a depth of several feet to aid in essentially complete removal of liquor.

After the liquor is removed, the mixture of carnallite and halite crystals is contacted with water vapor in step 16 to decompose the carnallite into KCl solids and $MgCl_2$ in solutions. Since there are six mols of water for each mol of KCl plus $MgCl_2$ in a mol of carnallite, the decomposition releases considerable amounts of bound water. This water serves to aid in draining and dissolving the soluble components while leaving the solid crystals. Approximately one part of water of hydration is released for each 2.5 parts of water absorbed from the external source.

I have found it possible to utilize moisture from the atmosphere in contacting the crystals in step 16 with water vapor. Since carnallite is extremely deliquescent, it absorbs water from the air when the air temperature generally is below about 50° C. and there is sufficient relative humidity. It is believed that the deliquescence of carnallite is caused by the presence of a minute surface film or sheath of liquor over the crystals of carnallite. The surface film is in equilibrium with the crystals of carnallite and the ambient atmosphere. The film either absorbs or gives off moisture depending on the relative humidity of the surrounding atmosphere and the heat balance.

Evaporation of water requires energy while condensation of water releases energy. Decomposition proceeds during the winter season in many areas of the world when the exothermic process of condensation particularly at night exceeds the endothermic process of evaporation during the day. The surface film exerts a vapor pressure in equilibrium with the air since it is in liquid state. When the vapor pressure of the solution in the form of a film on the crystals is higher than the vapor pressure of the water in the air, water from the solution is evaporated. But if the vapor pressure of the solution is lower than the water vapor pressure of the surrounding air, the film of solution on the crystals tends to absorb moisture from the air. Therefore, it is necessary simply that the water vapor pressure in the atmosphere be sufficiently greater than the water vapor pressure of the film of solution on the carnallite so that water is absorbed in an attempt to restore a balance. The absorbed water decomposes the carnallite crystals with new imbalance purposely created by withdrawal of liquor as soon as formed until all carnallite has been decomposed.

On decomposition of carnallite, KCl crystals form, while the $MgCl_2$ dissolves in a solution containing added water condensed from vapor and the water of crystallization of the carnallite. NaCl, which is generally present in mixture with carnallite, dissolves in part in an amount approximately equal to the dissolved K, and therefore largely remains in the crystalline state. The solution which is drained from the decomposed carnallite is saturated in carnallite and halite. It has been determined that a solution in equilibrium with carnallite has about 8 mols KCl to about 75 mols $MgCl_2$, or nearly a 10 to 1 ratio of $MgCl_2$ to KCl. Consequently, on decomposition of the solid carnallite, which has a 1 to 1 ratio of KCl to $MgCl_2$, crystals of KCl form leaving $MgCl_2$ in solution, since the $MgCl_2$ is almost 10 times more soluble than KCl. When the decomposition is rapid, a finely-divided KCl sludge is formed, which is the normal result in mechanically agitated tanks. When decomposition occurs slowly over a period of weeks or months (instead of minutes) KCl crystal growth occurs.

The unique crystals formed by the present method appear to be the result of a lack of "epitaxy" or mutual orientation of KCl crystals with other crystals, predominately NaCl in the decomposition mixture. Epitaxy has been described in Bull. Soc. Franc. Mineral 51, 1–156 (1928) by M. L. Royer as a coupling or ordered grouping of crystals of different kinds. Where a mass containing crystals of both NaCl and KCl in various orientations is spread with a concentrated solution of KCl, oriented crystals of KCl will be deposited on all the particles of NaCl, while particles of KCl will be covered solely by a continuous layer. Thus, by repeatedly contacting the carnallite and its decomposition products with a concentrated solution of KCl which results on atmospheric decomposition, gradual growth by daily formation of a continuous layer produces large KCl crystals. NaCl, on the other hand, forms the various mutually oriented combinations with KCl (which are later separated) as a result of what has been called "the law of epitaxy."

Best results are obtained when the carnallite to be decomposed is fine grained. This can be accomplished by a rapid "salting out" precipitation which inhibits large crystal growth of the carnallite. That is, when carnallite is formed by rapid mixture of a precipitating agent with a saturated solution of carnallite, small crystals are formed. In addition, agitation assists in forming fine grained crystals. Preferably, the carnallite crystals should be less than 14 mesh.

For economic reasons, it is desirable to simply absorb moisture from the atmosphere into open beds of carnallite or mixture thereof, since this does not require extensive equipment, material handling, or penetration. In many areas of the world, a night-time relative humidity of 60 to 85 percent is naturally present with low daytime evaporation, especially during certain seasons. However, conditions are not always satisfactory for recovering sufficient water from the atmosphere. It is necessary to prevent the evaporation during the day of water which is absorbed during the night. In the Sechura Desert in the Bayovar section of Peru, the evaporation during the winter in the daytime is sufficiently low that the reformation of the carnallite is low. In this area, the relative humidity averages between 60 to 80 percent. Temperatures are generally between about 16° C. to 19° C. at night and up to about 26° C. in the daytime, during the winter.

Other means of adding water vapor to the carnallite crystals include spraying droplets of water on the exposed surface of the carnallite by spray nozzles, spraying a mist through atomizer jets, or in fog chambers. While the term "water vapor" is employed herein to indicate the added water, it is contemplated that the sprays or mists of water may also be used. The water need not be in the truly gaseous state, but it should be borne on a gas. Moreover, steam may conveniently be used as the source of water vapor. Also, light rain or drizzle has been found to be very effective in adding moisture. However, heavy rains are detrimental since all crystals are dissolved and drained off. A combination of two or more of the above means, such as sprayed water and contact with atmospheric moisture may conveniently be used so that one water source supplements the other to speed up decomposition cycle.

Since the water decomposes only the carnallite which is exposed to the atmosphere, it is necessary to expose all the carnallite to the atmosphere for complete decomposition. While it is possible to lay the carnallite crystals in such a thin layer that all crystals are exposed to the atmosphere at one time, it is more practical to provide a substantial bed depth, say 20 cm., and to expose new surface periodically in step 17. On a small scale, the exposing of new surface may simply be by raking the crystals. On a large scale, a conventional road grader to which a harrow is attached may be used.

After the new surface has been exposed, the surface is contacted with further water vapor in step 16. Steps 16 and 17 are repeated as many times as necessary to produce the desired results.

In step 18, liquor is separated from the crystals of KCl and NaCl. The liquor contains $MgCl_2$ and only small amounts of KCl and NaCl. The separation is carried out by draining the liquor from the solid crystals by either gravity flow or by pumping the liquor away from the crystals. The liquor 19 is either discharged to waste or returned to feed brine 11. I prefer to carry out step 18 continuously during the decomposition of carnallite. Otherwise, the liquor tends to evaporate and reach a concentration at which carnallite is reformed. Furthermore, decomposition takes place only when the solids are exposed. By continuously separating the liquor from the crystals in step 18 and repeatedly turning over new surface in step 17 and contacting with further water vapor in step 16 (preferably daily), large crystals of KCl are built up without reformation of carnallite. The gradual decomposition is far superior to rapid decomposition of the formation of large, high quality KCl crystals.

The solids are transported to the process plant in step 21. In step 22, the KCl crystals are separated from the NaCl crystals. This step requires the use of a processing plant. It will be noted that all previous steps have been adapted to be performed outside a process plant with simple and inexpensive equipment, such as the solar pans which serve a dual function thus reducing investment in process equipment.

Step 22 is conveniently carried out in a flotation plant in a brine medium. The solids are prepared for flotation by controlled grinding and conditioning with amine hydrochloride or amine acetate. Conditioning is carried out by agitating a mixture of solids and amine for a few minutes before adding brine. The solids include, in addition to KCl and NaCl, some residual carnallite. This carnallite is decomposed by adding water or brine at a concentration less than 75 mols $MgCl_2$ per 1,000 mols of water. The KCl made by rapid mechanical decomposition has an unmarketable particle size but is particularly well suited for use as a raw material in manufacture of $K_2SO_4$. The fine KCl is separated from the coarse by screening, for example, and the fines may be used in $K_2SO_4$ manufacture. The KCl is floated from the NaCl tails which may be discharged to waste at 23 or recycled to the solar pans to dissolve residual K. Flotation cells of standard design are used.

The KCl containing heads of the flotation process are refined in step 24 to produce marketable muriate of potash.

Table I illustrates the improvement in particle size and quality of the flotation concentrate by the present method. The particle size of flotation concentrate from mechanically decomposed carnallite is compared to that from atmospheric decomposed carnallite. The mechanical decomposition took place in agitated tanks for a period of four hours. The atmospheric decomposition was carried out over a period of four days.

TABLE I

| Mesh | Mechanical, percent cumulative | Atmospheric, percent cumulative |
| --- | --- | --- |
| +28 | 0 | 4.5 |
| +35 | 0 | 33.3 |
| +65 | 0 | 90.3 |
| +100 | 59.6 | 95.1 |
| −100 | 40.4 | 4.9 |

In the example shown in Table I, the float concentration of the mechanically decomposed carnallite was 80.5% KCl. In contrast, the flotation concentrate of the atmospheric decomposed carnallite was 93.7% KCl. The large size of the KCl particles is shown by the fact that ⅓ of the particles derived from the atmospheric decomposition are larger than 35 mesh. More importantly, over 90% of the particles are larger than 65 mesh, while none of the particles under the conventional mechanical decomposition are that large. Consequently, not only are the particles larger, but the quality of the particles is improved substantially.

In the process described thus far, the carnallite which is decomposed is in the form of a mixture with halite. Mixtures of carnallite with other salts may be treated according to the same process to reduce harvesting and transportation costs and to obtain fresh water from a source otherwise not available. Thus, when the brine is concentrated to a density above approximately 1.30, magnesium sulfate tends to crystallize in admixture with carnallite and halite. The $MgSO_4$ is hydrated with from 1 to 7 mols $H_2O$ and may also be a double salt with various potassium or sodium salts. The $MgSO_4$ occurs predominately as the tetrahydrite ($MgSO_4 \cdot 4H_2O$), the pentahydrite ($MgSO_4 \cdot 5H_2O$), and the hexahydrite ($MgSO_4 \cdot 6H_2O$).

When contacted with water vapor, the carnallite decomposes to KCl as described above. The $MgSO_4$ tends to form a lower hydration state, thereby releasing some of the water of crystallization. The magnesium sulfate also is deliquescent, so that, unlike halite, the $MgSO_4$ salts absorb moisture from the air in the same manner as does carnallite.

Therefore, mixtures of carnallite with $MgSO_4$ have the advantage of absorbing a greater amount of moisture from the water vapor for the same amount of carnallite. Also, decomposition of the mixture improves the quality of magnesium sulfate salts. When mixtures of carnallite and $MgSO_4$ are contacted with water vapor, high quality KCl crystals form, lower $MgSO_4$ hydrates form, and various K-Mg-$SO_4$ double salts form which are already partly converted to the desired ultimate product for marketable $K_2SO_4$. Among these double salts is kainite $$(KCl \cdot MgSO_4 \cdot 3H_2O)$$

Therefore, less fresh water is required in producing potassium sulfate than would otherwise be required by virtue of the fact that fresh water for decomposition is added in the field prior to the entry of the salts into the processing plant.

Inasmuch as magnesium sulfate is deliquescent, the amount of carnallite in admixture therewith need not be substantial. In fact, it is possible to carry out the process with magnesium sulfate crystals mixed with little or no carnallite.

FIGURE 2 shows an alternative flow sheet illustrating the process as carried out with a mixture of carnallite, magnesium sulfate, and halite. Incoming brine 11 follows the same steps as in FIGURE 1 initially. However the liquor separated in step 13 is then concentrated to a density above about 1.30 in step 31 to crystallize the $MgSO_4$ salts along with the carnallite and halite. The liquor is separated in step 32 from the salts. Separation may be effected as described above with respect to carnalite-halite mixtures. Liquor is transported to feed brine 11 at 33. The separated mixture of carnallites, $MgSO_4$ and halite is contacted wtih water vapor in step 34 which decomposes the carnallite and changes the $MgSO_4$ to a lower state of hydration. New surfaces are exposed in step 36 to assure that the water vapor reaches all parts of the crystalline mixture. Steps 34 and 36 are repeated over a substantial period to slowly decompose the carnallite.

When carnallite-$MgSO_4$ mixtures are contacted with water vapor, the decomposition products are less well defined than with carnallite-halite mixtures and include a variety of potassium and $MgSO_4$ containing crystals. Which crystals form depends upon temperature, composition, and other conditions. In step 37 these potassium and MgSO₄ containing crystals are separated from the liquor along with NaCl crystals. The liquor is transported back to feed brine 11 or to waste at 38. Thereafter, the crystals containing potassium and MgSO₄ are transported to a processing plant where $K_2SO_4$ is recovered in step 39.

FIGURE 3 illustrates the percent of feed salts, containing principally carnallite, which is decomposed and the weight reduction in terms of time elapsed. The time elapsed in FIGURE 3 is measured from the beginning of step 16 (FIG. 1) and step 34 (FIG. 2) where the carnallite and halite crystals are first contacted with water vapor to step 19 (FIG. 1) and step 37 (FIG. 2) where the salt mixtures are transferred to the processing plant. Steps 17 and 36, exposing new surfaces, were carried out weekly, while the contact with water vapor (steps 18 and 34) were carried out nightly by absorbing water from the atmosphere. As shown in FIGURE 3, 43 percent of the feed carnallite was decomposed within a week and 70 percent was decomposed within 4 weeks. As to weight reduction, only 70 percent by weight of the initial feed carnallite need be transported to the process plant after one weeks' time. After four weeks' time, less than ½ of the initial carnallite weight need be transported to the processing plant for carrying out step 22.

The data for FIGURE 3 were compiled under ideal conditions on a small scale. For large scale operations under all conditions, I have found a 50 percent decomposition within 2 months to be a realistic goal. On the other hand, it is possible to obtain a 90 percent or greater decomposition of carnallite if steps 16 to 19 are repeated often enough. Generally speaking, the length of time required for a 90 percent decomposition may not be economically feasible where suitable area for solar pans is limited.

Other variables which affect the results depicted in FIGURE 3 are: depth of bed; season of year; relative humidity; temperature; type and frequency of agitation; efficiency of liquor drainage; and surface area of the bed of particles. Thus, thinner beds of crystals improve results. The winter season is used to advantage because of (1) the higher relative humidity and lower temperatures encourage decomposition, and (2) lower evaporation rates in winter reduce the formation of carnallite crystals during the day from the solutions derived at night. High relative humidity increases the amount of moisture absorbed by the deliquescent solids and low temperature improve condensation. Thorough and frequent agitation to expose all carnallite crystals aids in attaining complete decomposition. Draining of all liquor as it is formed prevents reformation of carnallite. The use of fine grained carnallite crystals improves efficiency by increasing the exposed surface area and being more easily agitated to provide new surfaces.

FIGURE 4 illustrates the improvement in grade of KCl which is obtained by atmospheric decomposition of carnallite. The precent of KCl that is obtained from the harvested salt gradually increases as atmospheric decomposition takes place. If the amount of water vapor is increased, the grade improvement correspondingly increases. Thus, on the 45th and 46th days after decomposition began, slight rainfall occurred which improved the percent of KCl nearly 10 percent. The amount of rainfall was only 2.8 millimeters. Substantially more rainfall would dissolve some of the KCl and therefore reduce the yield. Consequently, gradual application of small amounts of water is necessary for optimum results. The bed depth in FIGURE 4 was 4 to 5 cm. At this shallow depth, some improvement in grade occurs even without agitation or stirring of the carnallite crystals. However, FIGURE 4 shows that stirring the bed on a daily basis improves the grade substantially.

FIGURE 5 illustrates a structure particularly well adapted to carry out the present method. A solar evaporation pan, indicated generally at 51 is provided with levies or dikes 52 and 53, to hold the water in. Beneath the pan is a hard, impervious bed 54 of any suitable material, for example, of clay, diatomite, or other materials of a similar impervious nature. Bottom 54 minimizes leakage of the liquids from the pond. The sides of the solar pans 51 are rendered impervious by suitable means, such as vertical walls 56 and 57 which are conveniently composed of clay slurry. Within the imprevious walls and bottom, there is a mixture of coarse particles 58, for example sand and gravel. Particles 58 are stable in the brine and do not decompose. Above this, a hard bed 59 is formed to support the mechanical harvesting equipment. I have found a salt bed (NaCl) up to 10 inches in thickness to be suitable, since it has the structural strength required, yet is pervious to the liquor which is formed on atmospheric decomposition. In this illustration, bed materials are considered "impervious" if the leakage rate is less than $10^{-5}$ cm./second. Above the bed 59, brine is concentrated to deposit carnallite crystals 60. The salt bed 59 is compacted and smoothed to form a plane of discontinuity which will not interlock or combine with the crystals 60 which are deposited on evaporation of the appropriate amount of water. The deposition of carnallite may take place during the summer season, if desired, and the decomposition during the winter.

Bed 58 of coarse particles may be of any suitable depth. It is generally not desirable to exceed 5 meters in practice because of the difficulty in making side walls 56 and 57 greater than 5 meters high. The minimum depth of bed 58 is limited only by the ability of the bed to collect brine below crystals 60 and may be only a few inches. Alternatively, a portion of the crystals 60 may act as the bed, or porous layer 58, although efficiency might be reduced if there is no separate porous layer 58 over impervious bed 54.

Crystals 60 are formed to a depth preferably below 20 centimeters. Greater depths may be used, but such beds require a longer period of time and more agitation to expose all of the surface for atmospheric decomposition. When the depth of bed 60 is less than about 5 cm. the harvesting costs in proportion to the recovered crystals generally exceeds an economical level.

Means 61 is provided to remove liquor which filters through bed 58. As liquor reaches the bottom of bed 58, it is received into intake means 62 of means 61, which is conveniently a pump, and transported through conduit 63 for appropriate disposal.

In operation, atmospheric moisture decomposes the carnallite, leaving KCl solids and decomposed liquor which drains into bed 58. Bed 58 serves as a sand filter and the liquor tends to collect on the bottom of bed 58 since it cannot penetrate hard bottom 54. Means 61, such as a pump, discharges the liquor frequently, so that salt mixture 60 is always relatively dry.

In actual practice of the present invention, I have prepared a mixture of carnallite and halite feed crystals from brine in accordance with the process described in my copending application. The process is carried out by solar evaporation in large earthen ponds. The brine which is introduced at 11 into the pan is at a depth between 10 and 20 centimeters. Satisfactory results have been obtained with a brine depth up to 30 cm. Beyond 30 cm. evaporation rate decreases because the reservoir of brine to be heated is large as respect to solar energy so that water does not come off as vapor. Also dike costs increase to an uneconomical level with a brine depth much beyond 30 cm. On concentration in step 12, between about 5 and 10 centimeters of carnallite and halite crystals are formed. When the liquor is drained in step 13, therefore, the mixed crystals have a depth of only about 5 to 10 centimeters. These crystals are contacted with air at a relative humidity of between 60 and 80 percent each night so that absorbed moisture slowly decomposes the carnallite into crystallized solid KCl and $MgCl_2$ in solution. By continuously pumping or draining off the absorbed water, the water of crystallization and the salts dissolved therein, it is possible to prevent evaporation of the water during the daytime, resulting in reformation of carnallite.

Every few days, a road grader having a harrow attachment is passed over the surface of the mixture of carnallite, KCl nd NaCl. The grader turns over new surface to be exposed to atmospheric moisture. After 2 months, the remaining crystals are gathered by windrowing equipment into long piles. The crystals are allowed to drain for several days, after which a suitable mechanical scraper collects the crystals into a large pile. The harvested crystals are then transported to a processing plant where step 22 is carried out.

In the processing plant, the harvested crystals are placed in a series of, for example, three agitated tanks and mixed with a brine low in $MgCl_2$. The brine decomposes the remaining carnallite which was not decomposed in the solar pans. The mixture is thickened and conditioned with amine hydrochloride. KCl is then recovered by flotation with NaCl rejected in the tailings. Because the KCl particle size is improved, less NaCl is mechanically carried over in the float concentrate froth compared to sylvite-halite mixtures from processes based solely on mechanical decomposition.

The KCl crystals derived from this process have characteristics not heretofore obtainable in commercial processes for decomposing carnallite. As noted in Table I, supra, 90% of the particles are larger than anything produced by conventional carnallite decomposition processes. The discrete particles are generally much purer than that commercially available. Separation of the large particles of KCl from contaminants such as halite is much easier. The particles are formed from square cubes of relatively large size interlocked together with strong interfacial adhesion. Compaction or recrystallization generally practiced to improve particle size is therefore unnecessary to form a marketable product.

EXAMPLE 1

A dry carnallite-halite mixture was formed in a pan of the type shown in FIGURE 5, having an area of approximately 20 square meters at a depth of about 5 cm. Each night the crystals were contacted with moist air having a relative humidity between about 60 and 80% at a temperature averaging about 19° C. The daytime relative humidity was also about 60–80%, and temperature averaged 19° C. during the day. The liquor which formed from absorbed water was removed each morning. The salt mixture was stirred each morning with rakes to expose new surface. The liquor analysis during seven weeks of atmospheric decomposition is shown in Table II. In this table, for each week the amount of each of the 5 ions K, Mg, Na, Cl, and $SO_4$ are given in addition to water as percent of the liquor obtained. In addition, the last two columns of Table II show the actual number of liters of liquor obtained each week and the percentage of total liquor this represents.

TABLE II

| Week | Percent K | Percent Mg | Percent Na | Percent Cl | Percent SO$_4$ | Percent H$_2$O | Liters | Liquor, percent |
|---|---|---|---|---|---|---|---|---|
| 1 | 1.2 | 7.0 | 1.1 | 21.4 | 2.6 | 66.7 | 440 | 56.33 |
| 2 | 1.5 | 6.5 | 0.9 | 20.4 | 1.9 | 68.80 | 119 | 15.24 |
| 3 | 1.6 | 6.2 | 1.4 | 20.7 | 1.5 | 68.60 | 63 | 8.07 |
| 4 | 1.9 | 6.0 | 1.2 | 20.4 | 1.0 | 69.50 | 85 | 10.88 |
| 5 | 1.9 | 6.1 | 1.0 | 20.3 | 1.0 | 69.70 | 17 | 2.18 |
| 6 | 3.7 | 4.3 | 2.1 | 18.5 | 1.0 | 70.40 | 20 | 2.56 |
| 7 | 2.0 | 4.9 | 1.3 | 17.8 | 0.4 | 73.60 | 37 | 4.74 |
|  |  |  |  |  |  |  | 781 | 100.00 |

It will be noted from Table II that the concentration of Mg and Cl is substantially greater than the other ions, since KCl remains in crystalline form and the $MgCl_2$ component of carnallite is dissolved into the liquor. The amount of water obtained from the atmosphere and from the water of crystallization of carnallite gradually decreases with the passage of time because less carnallite is present to deliquesce and to decompose as time passes. Also, temperature rose with the onset of spring during the period covered by Example 1, decreasing condensation rate. The decrease in the amount of liquor is not constant because the relative humidity of the atmosphere varies. In fact, slight rainfall of the type common in desert regions occurred during week 6, accounting for a slight increase in liquor.

The weighted analysis of the liquor derived in Example 1 is shown in Table III as percent; as mols; and as double equivalent mols per 1000 mols of water. Also shown in Table III is the theoretical double equivalent mols per 1000 mols of water 25° C., as derived from a carnallite-halite mixture.

TABLE III

|  | K | Mg | Na | Cl | SO$_4$ | H$_2$O |
|---|---|---|---|---|---|---|
| Liquor weight analysis, percent | 1.472 | 6.562 | 1.139 | 20.746 | 2.052 | 68.03 |
| Mols | .0188 | .2700 | .0248 | .2922 | .0214 | 3.779 |
| Mols/1,000 | 5.0 | 71.4 | 6.6 | 77.3 | 5.7 |  |
| KCl-MgCl$_2$-NaCl mols/1,000 theoretical at 25° C | 5.8 | 72.0 | 3.7 | 81.5 |  |  |

It will be noted from Table III that a close approach to the theoretical equilibrium data is achieved by Example 1, indicating good process efficiency in decomposing carnallite.

Table IV shows the solids analysis for the same period shown in Table II for the solids decomposed in Example 1. In this table, the amount of each of the ions is given in percent. It will be noted from Table IV that the percentage of potasium in the solids increases with the continued decomposition. The percentage of Mg decreases, since $MgCl_2$ goes into solution.

TABLE IV

| Week | Percent K | Percent Mg | Percent Na | Percent Cl | Percent $SO_4$ |
|---|---|---|---|---|---|
| 0 | 11.2 | 7.3 | 4.5 | 38.2 | 0.4 |
| 1 | 13.3 | 6.9 | 5.4 | 40.2 | 0.2 |
| 2 | 16.6 | 5.9 | 6.6 | 42.3 | 0.2 |
| 3 | 16.9 | 5.8 | 7.1 | 42.9 | 0.3 |
| 4 | 18.7 | 5.1 | 7.9 | 43.7 | 0.2 |
| 5 | 19.3 | 4.5 | 7.9 | 43.6 | 0.2 |
| 6 | 25.8 | 2.4 | 11.4 | 47.9 | 0.1 |
| 7 | 25.1 | 2.8 | 10.7 | 49.3 | 0.2 |

EXAMPLE 2

This example illustrates the results using the present method with decomposition of carnallite mixtures containing larger amounts of sulfate than in Example 1. A brine saturated in carnallite, magnesium sulfate and halite was introduced into a pan approximately 20 square meters at a depth of approximately 10 cm. The brine was evaporated to a density of about 1.36 crystallizing a mixture of salts containing the ions K, Mg, Na, Cl and $SO_4$, and the liquor was removed. The crystal bed depth was about 5 cm. Each night, the crystals were contacted with moist air having a relative humidity between about 60 and 80% at a temperature averaging about 19° C. The daytime relative humidity was also about 60-80% and temperature averaged 19° C. during the day. The liquor which formed from adsorbed water was removed each morning. The salt mixture was stirred each morning with rakes to expose new surface. Table V shows the composition of the solids (in percent) during a seven-week decomposition of carnallite-$MgSO_4$ halite solids.

TABLE V

| Week | Percent K | Percent Mg | Percent Na | Percent Cl | Percent $SO_4$ | Percent $H_2O$ |
|---|---|---|---|---|---|---|
| 0 | 5.4 | 9.2 | 4.1 | 23.7 | 19.6 | 38.0 |
| 1 | 5.5 | 9.0 | 4.9 | 24.1 | 19.7 | 36.8 |
| 2 | 6.2 | 8.7 | 5.4 | 23.4 | 21.5 | 34.8 |
| 3 | 7.3 | 6.1 | 5.8 | 22.3 | 24.7 | 33.8 |
| 4 | 8.4 | 7.5 | 7.1 | 19.6 | 28.3 | 29.1 |
| 5 | 8.9 | 7.9 | 6.2 | 19.7 | 27.6 | 29.7 |
| 6 | 8.7 | 7.9 | 6.8 | 20.7 | 28.0 | 27.9 |
| 7 | 8.5 | 7.9 | 6.4 | 20.3 | 27.3 | 29.6 |

It will be noted from Table V that the K content of the solids increases as the Mg content decreases (with dissolving of $MgCl_2$) in the decomposition of the carnallite. The sulfate content also increases, since the $MgSO_4$ remains largely in solid form.

Table VI illustrates the improvement resulting from the atmospheric decomposition described in Example 2. The percent of the various components is indicated first in the initial composition, and then in the final composition.

TABLE VI

| | Percent initial | Percent final |
|---|---|---|
| KCl | 10.3 | 16.2 |
| NaCl | 10.4 | 16.3 |
| $MgCl_2$ | 16.9 | 4.3 |
| $MgSO_4$ | 24.5 | 34.1 |
| $H_2O$ | 38.0 | 29.1 |

It will be noted from Table VI that the grade improvement in KCl is from 10.3 to 16.2%, or 57.2%. The grade improvement in $MgSO_4$ is from 24.5% to 34%, or 39.2%. On the other hand, the rejection of $MgCl_2$ was from 16.9 down to 4.3% or 74.5%. Consequently, the material brought to the processing plant has substantially improved KCl and $MgSO_4$ content, but very little $MgCl_2$ and a reduced amount of water of hydration. Harvesting costs, transportation costs, and process plant costs are thereby reduced while forming an intermediate mixture of salts containing largely $MgSO_4$ which is suitable for conversion to valuable products such as $K_2SO_4$, $Na_2SO_4$ or calcined $MgSO_4$.

It is apparent that the present method takes advantage of the property of deliquescence in carnallite and $MgSO_4$ to recover water from the atmosphere. The water recovery results in decomposition of the carnallite over a long period of time which builds up a large particle size KCl and other potassium containing salts. Purity with respect to $MgSO_4$ is also improved. The harvesting and transportation costs are substantially reduced by simple and economical process involving inexpensive equipment.

I claim:

1. In a method of producing KCl, the steps of repeatedly contacting fine grain particle size carnallite crystals in situ for a period of at least one week with water vapor, whereby the carnallite crystals decompose into KCl crystals and liquor, repeatedly separating the liquor from the KCl crystals, and recovering KCl crystals at least 90% of which have a particle size greater than 65 mesh.

2. A method as in claim 1, wherein the carnallite crystals are admixed with NaCl crystals.

3. In a method of producing KCl, the steps of decomposing carnallite crystals of less than 14 mesh by contacting a composition containing said carnallite crystals and a liquid film of dissolved carnallite on the exposed surface of the crystals of carnallite with an atmosphere containing water at a vapor pressure ratio of water to carnallite film sufficiently high to decompose carnallite in situ into KCl crystals having a particle size greater than 65 mesh and liquor, removing said liquor and recovering KCl crystals.

4. A method as in claim 3, wherein the atmosphere containing water is air at a relative humidity above 60 percent and at ambient temperature.

5. In a method of recovering potassium chloride, the steps of concentrating a brine containing potassium, chloride, magnesium, and sodium, crystallizing a mixture of carnallite and halite from said brine, separating said carnallite and halite crystals from the liquor, decomposing the carnallite in situ by contacting the mixture with an atmosphere containing water suspended therein whereby potassium chloride crystals are formed in admixture with halite crystals, separating the KCl and NaCl crystals from the liquor, and separating KCl crystals having a particle size greater than 65 mesh from NaCl crystals.

6. A method as in claim 5, wherein said mixture of carnallite and halite crystals is repeatedly subjected to said atmosphere containing water for a period of two months.

7. A method as in claim 5, wherein all steps except separating KCl crystals from NaCl crystals take place in the open prior to harvesting and transporting carnallite.

8. In a method of recovering KCl and $MgSO_4$, the steps of concentrating a brine containing potassium, chloride, magnesium, sodium and sulfate, crystallizing a mixture of carnallite, halite and $MgSO_4$ from said brine, separating said crystal mixture from the liquor, decomposing the carnallite, repeatedly contacting the mixture with an atmosphere containing water whereby KCl crystals having a particle size greater than 65 mesh are formed in admixture with $MgSO_4$ and halite crystals and $MgCl_2$ is dissolved, separating the remaining crystals from liquor.

9. In a method of recovering potassium chloride from a brine containing potassium, chloride, magnesium, and sodium, the steps of concentrating the brine to a density at which carnallite crystallizes in admixture with halite, separating said carnallite-halite mixture from the remaining liquor, draining the carnallite-halite crystals to a layer depth less than 20 cm., repeatedly contacting said crystal mixture with an atmosphere containing water to decompose the carnallite, recrystallizing KCl in situ in admixture with NaCl from the decomposition products, agitating the mixture of carnallite, halite and potassium chloride to expose new surface during the repeated contacting with an atmosphere containing water, repeatedly draining the liquor from the KCl and NaCl crystals, subjecting the KCl and NaCl crystals to flotation whereby KCl is separated from NaCl, and recovering KCl crystals.

10. In a method of recovering potassium chloride and magnesium sulfate from a brine containing potassium, chloride, magnesium, sodium, and sulfate, the steps of concentrating the brine to a density at which magnesium sulfate crystallizes in admixture with carnallite and halite, separating the crystal mixture from the remaining liquor, draining the crystals to a layer depth less than 20 cm., repeatedly contacting said crystal mixture with an atmosphere containing water to decompose the carnallite and reduce the amount of bound water, crystallizing potassium-containing salts in situ in admixture with NaCl and MgSO$_4$, agitating the mixture of crystals to expose new surface during the repeated contacting with an atmosphere containing water, repeatedly draining the liquor from the crystal mixture, and harvesting potassium-containing salts, MgSO$_4$, and NaCl crystals, and separating the NaCl crystals from the potassium containing salts and MgSO$_4$ crystals.

References Cited

UNITED STATES PATENTS

| | | | |
|---|---|---|---|
| 2,479,001 | 8/1949 | Burke et al. | 23—91 |
| 2,613,133 | 10/1952 | Anderson | 23—89 |
| 2,793,099 | 5/1957 | Clarke | 23—89 |
| 2,849,287 | 8/1958 | Atwood et al. | 23—38 |
| 2,968,525 | 1/1961 | Clark et al. | 23—38 |
| 3,026,194 | 3/1962 | Smith et al. | 23—89 XR |
| 3,048,478 | 8/1962 | Smith | 23—89 XR |
| 3,099,528 | 7/1963 | Hadzeriga | 23—91 XR |
| 3,101,247 | 8/1963 | Serowy | 23—89 XR |
| 3,323,875 | 6/1967 | Been | 23—89 XR |
| 2,758,912 | 8/1956 | Dancy | 23—89 XR |
| 3,333,920 | 8/1967 | Zandon et al. | 23—89 |
| 3,352,633 | 11/1967 | Nylander | 23—89 |
| 3,177,100 | 4/1965 | Mayer et al. | 23—223.5 XR |
| 3,379,584 | 4/1968 | Bean et al. | 23—223.5 XR |

OTHER REFERENCES

McPherson & Henderson book "A Course in General Chemistry," third edition, 1927, p. 202. Ginn & Co., New York and Boston, Mass.

J. W. Mellon's book "A Comprehensive Treatise on Inorganic and Theoretical Chemistry," vol. 2, 1922 edition, pp. 526, 527 and 529. Longmans, Green & Co., New York.

EDWARD STERN, Primary Examiner

U.S. Cl. X.R.

23—38, 91